March 3, 1953     W. H. BIXBY     2,630,557
REGULATED RECTIFYING APPARATUS
Filed July 11, 1951
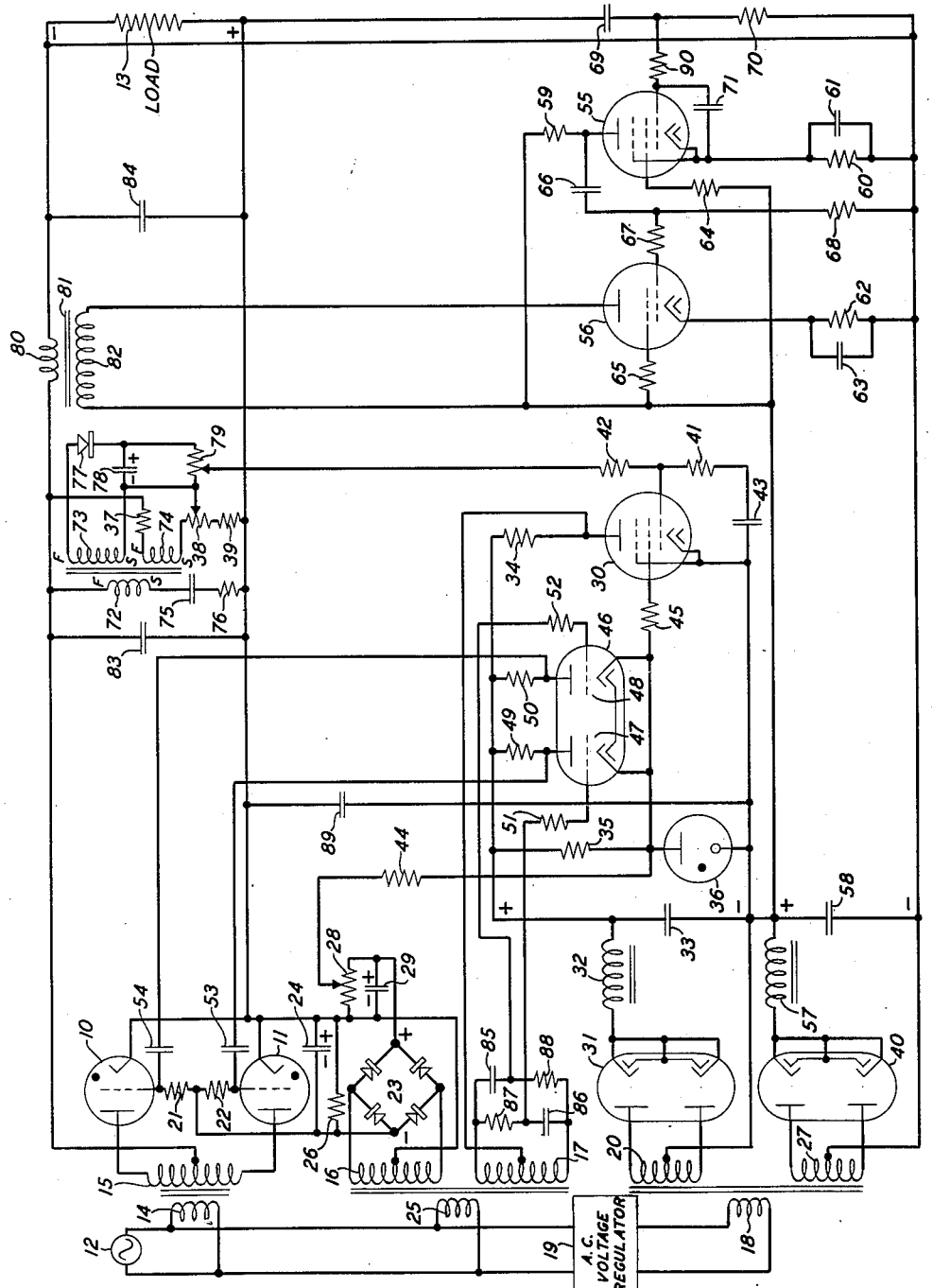
INVENTOR
W. H. BIXBY
BY
*G. F. Heuerman*
ATTORNEY Patented Mar. 3, 1953

2,630,557

UNITED STATES PATENT OFFICE 2,630,557

REGULATED RECTIFYING APPARATUS

William H. Bixby, Detroit, Mich., assignor to Donald R. Middleton and Stanley M. Hanley, doing business as Power Equipment Company, Detroit, Mich., a copartnership Application July 11, 1951, Serial No. 236,150

9 Claims. (Cl. 321—18)

This invention relates to voltage regulation and particularly to apparatus for supplying rectified alternating current to a load and for maintaining the load voltage substantially constant.

An object of the invention is to provide improved regulated rectifying apparatus for supplying direct current to a load.

In an embodiment of the invention herein shown and described for the purpose of illustration, there is provided for supplying direct current to a load a power rectifier somewhat similar to that disclosed in my pending patent application Serial No. 35,948, filed June 29, 1948, for example. That rectifier employs regulating means for maintaining the average output voltage substantially constant and a passive filter, comprising a series choke coil followed by a shunt condenser, for attenuating alternating components of the rectifier output. Where it is desired to reduce the ripple component of the load current supplied from a power rectifier to a very small amplitude, of the order of a few millivolts, for example, the inductance and capacitance elements of a passive filter become expansive and bulky. Moreover, where the time rate of change of output voltage must be held to low values, even under substantially instantaneous changes of a large fraction of the rated load current, the output capacitor bank must be made quite large if a purely passive filter network is employed.

Rectifier systems have been used heretofore in which active elements are employed for reducing the ripple component of the current supplied to the load and for improving the dynamic response of the system, such systems being typified by the series tube and shunt tube types of regulators. Such systems are limited in their application by the space current which can be transmitted through the high vacuum tubes employed therein. Moreover, the large voltage drop in series with the load encountered in such systems results in markedly reduced efficiency which is an important consideration when currents of the order of amperes are to be controlled.

The difficulties referred to above are overcome, in accordance with the present invention, by providing in the load circuit of a rectifier current supply system a ripple suppressing means comprising a first and a second shunt condenser and a transformer having one of its two windings connected in one side of the load circuit between the two condensers. In order to provide fast dynamic response in the rectifier and filter system, the choke coil ordinarily employed in a rectifier filter is omitted. There is provided an amplifier comprising a space current device to which space current is supplied through the second transformer winding, the currents in the transformer windings, respectively, setting up in the transformer core opposing magnetomotive forces which are preferably substantially equal at a value of load current at which optimum filtering is desired. Load voltage variations are impressed upon the amplifier for controlling the space current in the space current device to thereby minimize the load voltage variations.

The single figure of the drawing is a schematic view of a regulated rectifying apparatus embodying the invention.

Referring to the drawing, there is provided a rectifier comprising three-electrode, gas-filled, space current devices 10 and 11 for rectifying current from a 60-cycle alternating-current supply source 12 and for supplying the rectified current to a load represented by a resistor 13 which may be varied over a wide range of values. There is provided a transformer having a primary winding 14 connected to the alternating-current source 12 and a secondary winding 15. There is provided a second transformer having a primary winding 25 connected to the supply source 12 and having secondary windings 16 and 17. There is provided a third transformer having a primary winding 18 connected to the supply source 12 preferably, but not necessarily, through a voltage regulator 19 and two secondary windings 20 and 27. The end terminals of transformer winding 15 are connected to the anodes, respectively, of rectifier tubes 10 and 11 and a mid-tap of winding 15 is connected through the secondary winding 80 of a transformer 81 to the negative load terminal. The transformer 81 also has a primary winding 82, both transformer windings being wound on a core of magnetic material such as iron or steel. Secondary winding 80 of transformer 81 could equally well be connected in the lead going to the positive load terminal providing that it is so connected that the load current flows in the same sense through the winding 80. The cathodes of tubes 10 and 11 are connected to the positive load terminal. A condenser 93 is provided in a shunt current path across the rectifier output, that is, in a path connecting the mid-terminal of transformer winding 15 and the positive load terminal. A second shunt condenser 84 is provided in a current path connected across the load 13.

The control grids of tubes 10 and 11 are connected by resistors 21 and 22, each having a resistance of the order of 47,000 ohms. A bridge-type rectifier 23 having an asymmetrically conducting element in each arm of the bridge has its input terminals connected to the terminals of secondary transformer winding 16. The positive output terminal of rectifier 23 is connected to the cathodes of tubes 10 and 11 through a potentiometer 28 shunted by a condenser 29 and the negative output terminal of rectifier 23 is connected to the common terminal of resistors 21 and 22. A filtering condenser 24 and a bleeder resistor 26 are provided in a path connecting the common terminal of resistors 21 and 22 and the cathodes of tubes 10 and 11. The center tap of transformer winding 16 is connected to the cathodes of tubes 10 and 11. Rectifier 23 acts as two biphase rectifiers, condenser 24 being charged through the two left-hand rectifier elements, as viewed in the drawing, and condenser 29 being charged through the two right-hand rectifier elements, as viewed in the drawing. The control grid of each of tubes 10 and 11 is thus negatively biased with respect to its cathode to prevent space current conduction in each tube in the absence of a positive potential triggering or starting pulse impressed upon the control grid with respect to the cathode.

There is provided an amplifier comprising a space current device 30 for setting up a direct voltage having variations corresponding to load voltage changes but of larger amplitude. Space current is supplied to tube 30 from an auxiliary rectifier comprising a full wave rectifier tube 31. The anodes of tube 31 are connected to the end terminals of transformer winding 20 and the mid-terminal of the winding is connected to the negative output terminal of the rectifier. A ripple filter comprising a series inductive reactive element 32 and a shunt condenser 33 is provided, the cathodes of tube 31 being connected through inductance element 32 to the positive output terminal of the rectifier. The positive terminal of rectifier 31 is connected through a resistor 34 to the anode of tube 30 while the negative output terminal of the rectifier is connected directly to the cathode of tube 30. A shunt current path connected to the output terminals of rectifier 31 comprises in series a resistor 35 and a cold cathode, gas-filled tube 36. The tube 36 has the characteristic that its resistance changes in response to changes of current flowing through the tube so that the voltage across the tube remains substantially constant, output voltage changes of rectifier 31 appearing across resistor 35.

Means are provided for deriving from the load circuit across filter condenser 83 and impressing upon the control circuit of tube 30 a control voltage for causing changes of the direct component of the voltage across condenser 83 to be minimized. This means comprises a transformer having a primary winding 72 and secondary windings 73 and 74, the primary winding in series with a condenser 75 and a resistor 76 being connected in a shunt current path across condenser 83. A second shunt path across condenser 83 comprises in series a resistor 37, secondary transformer winding 74, potentiometer 38 and a resistor 39. Transformer windings 72 and 74 may have a 1:1 turns ratio, for example. Windings 72 and 73 may have a turns ratio of 1:2 or 1:3, for example. Care should be taken to avoid applying too large a portion of the ripple component of the voltage across condenser 83 to the grid-cathode circuit of tube 30 to prevent serious unbalance in the current division between rectifier tubes 10 and 11. The condenser 75 and resistor 76 in series present an impedance at the fundamental ripple frequency which is very low compared to the impedance looking into the transformer primary 72. As a result, nearly the entire ripple voltage component will appear across the primary 72 and also across the secondary 74 of the transformer. The phasing of the transformer windings is indicated by the letters S and F designating the start and finish terminals, respectively, of the various windings, all windings being wound in the same sense on the core. The secondary 74 is so connected that the ripple voltage across it opposes the ripple voltage component across condenser 83 in the circuit comprising condenser 83, resistor 37, winding 74, potentiometer 38 and resistor 39. The portion of the voltage across condenser 83 which appears across resistor 39 and a portion of potentiometer 38, connected in series in the grid-cathode circuit of tube 30, is thus nearly free of the ripple component. The product of the capacitance of condenser 75 in farads and the resistance of resistor 76 in ohms should be large compared with the fundamental ripple period but otherwise as small as possible. The resistor 76 should have a value sufficiently large to avoid spontaneous oscillations in the circuit comprising capacitor 83, primary winding 72, capacitor 75 and resistor 76. A condenser 75 of 125 microfarads and a resistor 76 of 500 ohms have been found satisfactory.

To provide load compounding, when required, that is, to correct for any tendency of the load voltage to decrease with increasing load current or even to cause the load voltage to rise with increasing load, if desired, there is provided a rectifying element 77, such as a germanium diode, in series with secondary transformer winding 73 and a condenser 78 shunted by a potentiometer 79. A common terminal of condenser 78, potentiometer 79 and winding 73 is connected to the variable tap of potentiometer 38. The voltage to which condenser 78 is charged, and therefore the voltage across the portion of potentiometer 79 between its variable tap and its terminal connected to the variable tap of potentiometer 38 is substantially proportional to the ripple voltage component across condenser 83 which, in turn, is substantially proportional to the load current. The amount of compounding obtained is adjustable by means of potentiometer 79. The time constant of the capacitance of condenser 78 in farads and the resistance of potentiometer 79 in ohms is large compared to the ripple voltage component across condenser 83 but otherwise as small as possible to provide quick response. A potentiometer 79 having a resistance of 100,000 ohms and a condenser 78 of 1-microfarad capacity have been found to be satisfactory. The potentiometer 28 and condenser 29 in the output circuit of auxiliary rectifier 23 are provided for correcting the load voltage for small changes of the line voltage from source 12.

The variable tap of potentiometer 79 is connected through a resistor 42 to the control electrode of tube 30. The cathode of tube 30 is connected through constant voltage tube 36, through a resistor 44 and through a portion of potentiometer 28 to the positive load terminal. A resistor 41 and a condenser 43 in series are provided in a path connecting the control electrode and cathode of tube 30. There is thus impressed upon the control grid-cathode circuit of tube 30 a resultant voltage equal to the voltage across resistor 39 and an adjustable portion of potentiometer 38, minus the voltage across an adjustable portion of potentiometer 79, minus the voltage across constant voltage tube 36, plus the voltage across an adjustable portion of potentiometer 28, the resultant voltage preferably being such that the control grid potential is negative with respect to the cathode potential by a suitable operating value. Screen grid potential is supplied to tube 30 from the common terminal of resistor 35 and constant voltage tube 36 through a resistor 45.

There is provided a pulse generating circuit arrangement comprising a twin triode tube 46 having two triode space current devices 47 and 48. The cathodes of triodes 47 and 48 are connected to the common terminal of resistor 35 and constant voltage tube 36. The positive terminal of rectifier 31 is connected through a resistor 49 to the anode of triode 47 and through a resistor 50 to the anode of triode 48. Resistors 49 and 50 each have a resistance of the order of 47,000 ohms. There is provided a phase shift bridge circuit comprising transformer winding 17, condensers 85 and 86, each of 0.1-microfarad capacity, for example, and resistors 87 and 88, each having a resistance of 25,000 ohms. The common terminal of condenser 85 and resistor 88 is connected through a resistor 52 to the control electrode of triode 48, the common terminal of condenser 86 and resistor 87 is connected through a resistor 51 to the control electrode of triode 47 and the mid-tap of transformer winding 17 is connected to the anode of tube 30, resistors 51 and 52 each having a resistance of the order of 470,000 ohms. The anode of triode 47 is connected through a condenser 53 to the control grid of tube 11 and the anode of triode 48 is connected through a condenser 54 to the control grid of tube 10, the capacitance of each of condensers 53 and 54 being of the order of 0.05 microfarad.

An increase of load voltage, a decrease of load current or an increase of line voltage will cause the control grid of tube 30 to become relatively more negative with respect to its cathode, thus causing the voltage across resistor 34 to decrease and the potential at the anode of tube 30 to become relatively more positive with respect to its cathode and, therefore, with respect to the cathodes of triodes 47 and 48. The voltage across resistor 35 will increase in response to an increase of voltage of the supply source 12 and vice versa, assuming that alternating-current voltage regulator 19 is omitted or that it is only partially effective. The grid-cathode circuit of triode 47 may be traced from the grid through resistor 51, through the phase shift bridge circuit to the center tap of winding 17, and through resistors 34 and 35 to the cathode. A similar circuit may be traced for the triode 48, this circuit including resistor 52. The voltages across resistors 34 and 35 are in opposition in each of these circuits and the voltage across resistor 34 is smaller than the voltage across resistor 35 so that the resultant direct voltage component in the grid-cathode circuit is of such polarity as to make the control grid positive with respect to the cathode.

The large resistance of resistor 51 in the grid-cathode circuit of triode 47, for example, limits the positive potential which can appear at the grid with respect to the cathode to a relatively small value because of the grid current which flows through the resistor. As a result, when the grid is positive, the triode will pass a fixed space current and the potential at the anode will remain substantially fixed with respect to the cathode up to the time when the alternating voltage component from transformer winding 17 in the grid-cathode circuit suddenly drives the grid to a negative potential through the cut-off value, causing the space current to decrease rapidly to zero. The alternating voltage component in the grid-cathode circuit has a large amplitude such that the change of grid-cathode voltage from a positive value to a negative cut-off value will occur within a very brief time interval. The resulting abrupt decrease of space current in triode 47 will produce an abrupt rise of the potential at the anode of triode 47 with respect to its cathode and, therefore, with respect to the cathode of tube 11. This sharp, positive pulse is impressed through condenser 53 upon the control grid of tube 11 to cause it to conduct space current, this conduction continuing during a period in which the anode of tube 11 is positive with respect to its cathode. The phase shift network comprising elements 85 to 88 is provided to give the proper phasing to the pulses applied to the control grids of rectifier tubes 10 and 11. A capacitor 89 of about 10 microfarads is provided in shunt with a path comprising a portion of potentiometer 28, resistor 44 and constant voltage tube 36, all in series, to prevent the charging currents for condensers 53 and 54 from seriously affecting the control circuit of tube 30 due to the impedance in line compensating potentiometer 28. The resistor 44 of about 1000 ohms is used to prevent the capacitor 89 from being connected directly across the constant voltage tube 36 when the tap of potentiometer 28 is effectively directly connected to the positive load terminal, thereby avoiding relaxation oscillations.

An increase of the direct component of the grid-cathode voltage of triode 47, for example, will cause the cut-off potential of the triode to be reached later in each cycle of the alternating voltage component of the grid-cathode voltage of the triode. As a result, the triggering or starting pulse impressed upon the grid-cathode circuit of tube 11 will occur later in the positive half cycle of the anode-cathode voltage, that is, when the anode is positive with respect to the cathode. The average voltage supplied by the rectifier to the load 13 is thus decreased. A negative pulse will be produced at the anode of triode 47 when space current is started in the triode due to the grid potential passing through the cut-off value to a positive value of potential. This negative pulse will have no effect on the space current path of tube 11 and it may therefore be disregarded in considering the operation of the current supply circuit. The triode 48 is controlled similarly to the triode 47 to produce recurring positive pulses for starting conduction of space current in tube 10 during half-cycle periods of the alternating voltage from source 12 when the anode of tube 10 is positive with respect to its cathode.

The load voltage may be set at a desired value within an operating range by adjusting the variable tap of potentiometer 38. When the potentiometer is adjusted for maximum operating voltage, the voltage across resistor 34 is at a relatively large value. Under this condition the direct voltage component in the grid-cathode circuit of each of triodes 47 and 48 is relatively small and conduction of space current in tubes 10 and 11 will occur relatively early in the positive half cycle of the anode-cathode voltage of each of tubes 10 and 11. For any setting of potentiometer 38, when an increase of load voltage occurs, for example, the control grid of tube 30 will become relatively more negative with respect to its cathode with the result that the voltage drop across resistor 34 will decrease. The direct voltage component in the grid-cathode circuit of triodes 47 and 48 will thus increase to cause the starting pulses impressed upon the grid-cathode circuits of tubes 10 and 11 to be delayed. The average load voltage supplied by the rectifier is thus decreased to cause the initially assumed increase of average load voltage to be minimized. Similarly, when the voltage of the supply source increases or when the current supplied to the load decreases, for example, the direct component of the voltage in the grid-cathode circuits of triodes 47 and 48 increases to cause the starting pulses for tubes 10 and 11 to be delayed, thereby causing a decrease of the average voltage supplied by the rectifier to the load 13. This action thus tends to prevent a rise of average load voltage due to the voltage increase of the alternating-current source 12 or due to a decrease of load.

There is provided an amplifier comprising a space current device 55 having an anode, a cathode, a control electrode, a screen grid and a suppressor grid, and a space current device 56 having an anode, a cathode, a control electrode and a screen grid. There is provided an auxiliary rectifier comprising a transformer winding 27, a rectifier tube 40 and a filter having a series inductance coil 57 and a shunt condenser 58. The space current path of tube 55 may be traced from the positive output terminal of rectifier 40 through resistor 59 to the anode, and from the cathode, through resistor 60, shunted by condenser 61, to the negative rectifier output terminal. The space current circuit of tube 56 may be traced from the positive output terminal of rectifier 40, through primary winding 82 of transformer 81 to the anode, and from the cathode, through resistor 62, shunted by condenser 63, to the negative rectifier output terminal. Screen grid potential for tube 55 is provided by connecting it through a resistor 64 to the positive terminal of rectifier 40. Screen grid potential for tube 56 is provided by connecting it through a resistor 65 to the positive output terminal of rectifier 40. The anode of tube 55 is connected through a condenser 66 and a resistor 67 to the control electrode of tube 56, the common terminal of condenser 66 and resistor 67 being connected through a resistor 68 to the negative output terminal of rectifier 40. Load voltage variations are impressed upon the control grid-cathode circuit of tube 55 by connecting the positive load terminal through a condenser 69 and a resistor 90 in series to the control electrode of the tube and by connecting the negative load terminal through resistor 60 to the cathode, a resistor 70 being provided in a current path connecting the control grid through resistors 90 and 60 to the tube cathode. A condenser 71 of about 0.0005 microfarad is provided in a path connecting the control electrode and cathode of tube 55 to prevent oscillation or singing of the circuit at a very high frequency.

The anode-cathode space current of tube 56 flows through primary winding 82 of transformer 81 in such a sense as to set up in the transformer core a magnetomotive force which opposes the magnetomotive force set up therein by the load current flowing through the secondary winding 80. The turns ratio of the windings of transformer 81 and the resistance value of resistor 62 are so chosen that the steady anode-cathode current of tube 56 produces a magnetizing ampere-turns in primary winding 82 which is equal and opposed to the magnetizing ampere-turns in the secondary winding 80 at a predetermined value of load current within an operating range at which optimum filtering or suppression of the alternating or ripple components of the load current is desired. The turns of the secondary winding 80 can usually be kept sufficiently low that no serious saturation of the iron core will take place at any operating amplitude of the load current from zero to full load current even though no gap is provided in the magnetic circuit of the transformer. The pentode voltage amplifier 55 amplifies the varying component of the voltage across the load 13 and across condenser 84 and applies the amplified voltage in the proper time relationship to the control grid-cathode circuit of the current control tube 56. When the load voltage is increasing, the control grid of tube 55 becomes relatively more positive with respect to its cathode to cause an increase of the space current of the tube flowing through resistor 59, thus making the control electrode of tube 56 relatively more negative with respect to its cathode. The resulting decreasing of space current of tube 56 flowing through the primary transformer winding 82 causes to be induced in the secondary transformer winding 80 a voltage in opposition to the voltage across the condenser 83, thus causing the initially assumed increase of load voltage to be minimized. When the load voltage is decreasing, on the other hand, the resulting voltage induced in secondary transformer winding 80 will be in aiding relationship to the voltage across condenser 83, thus minimizing the assumed decrease of voltage across condenser 84 and load 13.

No difficulty will be encountered with the arrangement disclosed in reducing by several volts the ripple component of the voltage across the load with respect to the ripple voltage across condenser 83. In a test of the circuit, the ripple component appearing across capacitor 83 was found to be 1.4 volts root mean square while the ripple component across the load capacitor 84 was found to be 0.0054 volt when the load current was 1.2 amperes and the average voltage across condenser 83 was 450 volts. The condensers 83 and 84 used in the circuit tested had capacitances of 2625 microfarads and 875 microfarads, respectively. Since the alternating component of the voltage across condenser 83 will have an amplitude of the order of volts while the voltage changes across the anode-cathode path of tube 56 may be of the order of magnitude of hundreds of volts, a turns ratio of winding 82 with respect to winding 80 of 100:1 or greater can be satisfactorily used in transformer 81. Thus an anode-cathode current change of 100 milliamperes in tube 56 would be sufficient to compensate for a load current change of 10 amperes flowing through transformer winding 80. With the arrangement disclosed, therefore, the compensating ability of an active filter employing high vacuum tubes is extended by a factor of 100 or more over that for the series or shunt tube types of regulators.

If a substantially higher degree of ripple suppression were required than that obtained in the test described above, the use of very high quality iron or steel in the core of transformer 81 would be found necessary, thus lowering the resultant unidirectional magnetomotive force required to reach the knee of the magnetization curve. In this event, careful balancing of the steady-state primary and secondary ampere-turns at each operating value of load current would be required. This may be accomplished, for example, by providing a small resistor in series with the load 13 and including the resistor in the series circuit connecting the control electrode and cathode of tube 56 so that, as the load current increases, the control grid will become relatively more positive with respect to the cathode by such an amount that the unidirectional ampere-turns of transformer windings 80 and 82 will remain substantially equal for all values of steady load current over the operating range. This balancing action can also be obtained by providing a tertiary winding for transformer 81 and an additional space current device through which current is supplied to the tertiary winding under control of the voltage across a small resistor in series with the load 13 impressed upon the control circuit of the space current device.

What is claimed is:

1. The combination with means for supplying current from a direct-current source the voltage of which may vary to a load, of means for minimizing voltage variations across said load comprising a first condenser connected across said supply means, a second condenser connected across said load, a transformer having a first and a second winding wound on a core of magnetic material, means for connecting said first winding in the current path for supplying current from said source to said load, the load current flowing through said first winding causing a first unidirectional magnetomotive force to be set up in said core, an amplifier comprising a space current device, means for supplying space current to said device through said second winding for setting up in said core a second unidirectional magnetomotive force in opposition to said first magnetomotive force, and means responsive to load voltage variations for controlling said space current to thereby minimize said load voltage variations.

2. The combination with means for supplying to a load circuit including a load current from a direct-current source the voltage of which may vary, of means for minimizing voltage variations across said load comprising a first and a second condenser each connected across said load circuit, a transformer having a first and a second winding wound on a core of magnetic material, means for connecting said first winding in series with said load in a portion of said load circuit between said first and second condensers, means for supplying direct current to said second winding in a direction such as to reduce the flux set up in said core due to the current in said first winding, and means responsive to load voltage variations for controlling the current in said second winding to cause to be induced in said first winding a voltage for reducing said load voltage variations.

3. A combination in accordance with claim 2 in which the ampere-turns of said second winding are substantially equal to the ampere-turns of said first winding for a desired amplitude of load current so as to reduce the flux in said core substantially to zero in the absence of load voltage variations.

4. The combination with means for supplying to a load circuit including a load current from a direct-current source the voltage of which may vary, of means for minimizing voltage variations across said load comprising a first and a second condenser connected in shunt current paths across said load circuit respectively, a transformer having a first and a second winding wound on a core of magnetic material, means for connecting said first winding in series with said load in a portion of said load circuit between said first and second shunt condensers, the load current flowing through said first winding causing a first unidirectional magnetomotive force to be set up in said core, an amplifier comprising a space current device, means for supplying through said second winding to said space current device a unidirectional current for causing to be set up in said core a second unidirectional magnetomotive force opposed to said first unidirectional magnetomotive force and substantially equal thereto in magnitude when the load current has a desired steady amplitude, and means for impressing upon said amplifier a voltage having variations corresponding to load voltage variations for controlling the current in said space current device, whereby there is induced in said first transformer winding a voltage for causing said load voltage variations to be minimized.

5. In combination, means for rectifying current from an alternating-current supply source and for supplying the rectified current to a load circuit comprising a load, means connected to said load circuit responsive to changes of average load voltage for controlling said rectifier to minimize said changes of average load voltage, a first and a second condenser connected in shunt current paths across said load circuit respectively, a transformer having a first and a second winding wound on a core of magnetic material, said first winding being connected in series with said load in a portion of said load circuit connecting a terminal of said first condenser and a terminal of said second condenser, the load current flowing through said first winding setting up a first unidirectional magnetomotive force in said core, a space current device having electrodes between which a space current may flow and control means to which a voltage may be applied for controlling said space current, means for supplying space current to said space current device through said second winding to set up in said core a second unidirectional magnetomotive force opposed to said first magnetomotive force and substantially equal thereto in magnitude for a predetermined amplitude of load current, and means for amplifying an alternating component of the load voltage and for applying the amplified alternating component to said control means, whereby an alternating voltage is induced in said first winding for causing the alternating load voltage component to be minimized.

6. In combination, a condenser, a rectifier for rectifying current from an alternating-current supply source to set up across said condenser a unidirectional voltage having an alternating component, a transformer having a primary and a secondary winding, a first current path connected across said condenser comprising said primary and in series therewith a circuit portion the impedance of which to the fundamental frequency of said alternating component is low with respect to the impedance looking into said primary, and a second current path connected across said condenser comprising said secondary and resistance means in series therewith, the alternating component voltage across said secondary being substantially equal and opposed to the alternating component voltage across said condenser in the circuit comprising said second current path and said condenser.

7. In combination, a condenser, a rectifier for rectifying current from an alternating-current supply source to set up across said condenser a unidirectional voltage having a relatively steady voltage component and an alternating voltage component of a certain fundamental frequency, a first current path connected across said condenser comprising resistance means, and means for reducing to a low amplitude or substantially zero the alternating-current component in said first current path, said means comprising a transformer having a secondary connected in series with said resistance means in said first current path and a primary connected in a second current path across said condenser in series with impedance means the impedance of which is low with respect to the impedance looking into said primary at said fundamental frequency.

8. A combination in accordance with claim 7 in which said impedance means comprises a resistor and a second condenser in series.

9. A combination in accordance with claim 7 in which are provided a second condenser shunted by a second resistance means, a tertiary winding for said transformer, an auxiliary rectifier for charging said second condenser by current from said tertiary winding, and means for combining and utilizing the voltages across portions at least of said first and second resistance means respectively for controlling said rectifier for rectifying current from said alternating-current supply source.

WILLIAM H. BIXBY.

REFERENCES CITED

The following references are of record in the file of this patent:

UNITED STATES PATENTS

| Number | Name | Date |
|---|---|---|
| 895,965 | Clinker | Aug. 11, 1908 |
| 1,621,443 | Trevor | Mar. 15, 1927 |
| 1,712,677 | Peter | May 14, 1929 |
| 1,822,618 | Gebhard | Sept. 8, 1931 |
| 1,832,646 | Miessner | Nov. 17, 1931 |
| 1,839,869 | Davis | Jan. 5, 1932 |
| 1,873,952 | Aubert | Aug. 30, 1932 |
| 1,943,088 | Power | Jan. 9, 1934 |
| 2,106,793 | Burton | Feb. 1, 1938 |
| 2,456,638 | Kenyon | Dec. 21, 1948 |